No. 888,150. PATENTED MAY 19, 1908.
E. C. EVERETT & F. SCHINDEWOLF.
BURNER FASTENING FOR LAMPS AND LANTERNS.
APPLICATION FILED OCT. 27, 1905.
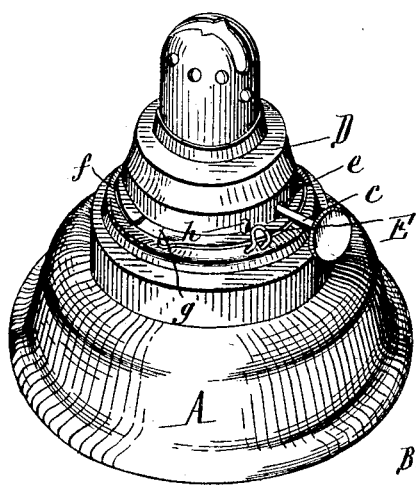
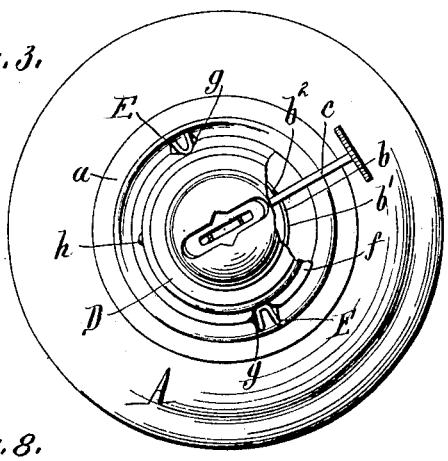
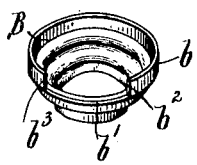
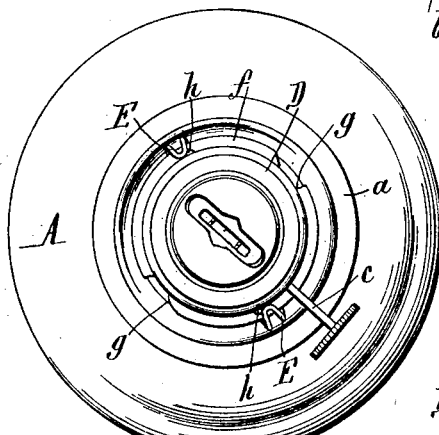
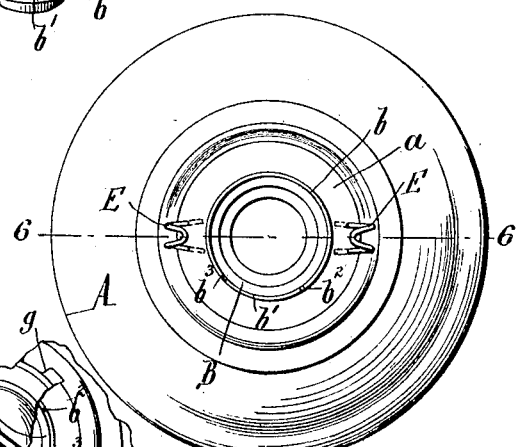
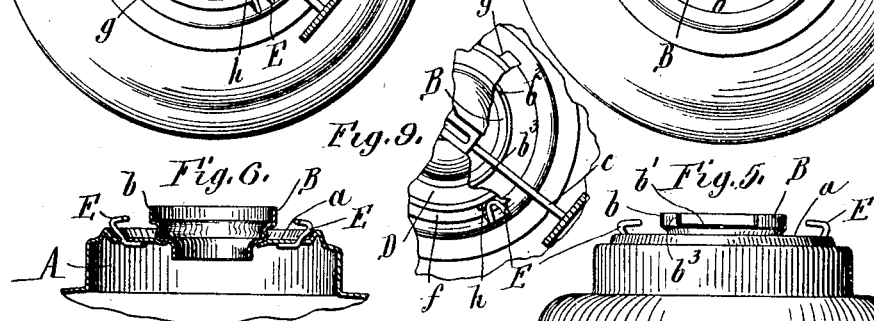
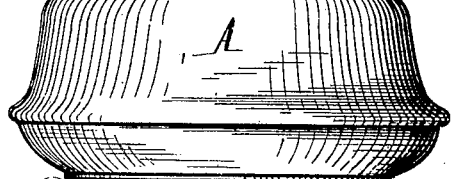
Witnesses:
R. W. Rumser.
E. A. Volk.
Ernest C. Everett, Inventors
Fritz Schindewolf
By Wilhelm, Parker & Hard, Attorneys.

UNITED STATES PATENT OFFICE.

ERNEST C. EVERETT AND FRITZ SCHINDEWOLF, OF NEW YORK, N. Y., ASSIGNORS TO R. E. DIETZ COMPANY, OF NEW YORK, N. Y.

BURNER-FASTENING FOR LAMPS AND LANTERNS.

No. 888,150.  Specification of Letters Patent.  Patented May 19, 1908.

Application filed October 27, 1905. Serial No. 284,641.

*To all whom it may concern:*

Be it known that we, ERNEST C. EVERETT and FRITZ SCHINDEWOLF, both citizens of the United States, residing at New York, in the county of New York and State of New York, have invented a new and useful Improvement in Burner-Fastenings for Lamps and Lanterns, of which the following is a specification.

This invention relates to fastenings for that kind of burners which contain a cone surmounting the wick tube and has particular reference to fastenings which engage the base of the cone and which are so constructed that the cone is secured or released by a rotary movement of the cone on its support.

The object of this invention is to produce a fastening of this character which is provided with simple and efficient means for securely holding the cone against rotation, particularly in the backward or releasing direction, and further, to construct the parts in such manner that the burner can be quickly and conveniently applied to its support or removed therefrom.

In the accompanying drawings: Figure 1 is a perspective view of an oil pot and burner provided with this improvement. Fig. 2 is a top plan thereof showing the burner secured in place. Fig. 3 is a similar view with part of the cone broken away and showing the burner in the position in which it is placed on the oil pot, preparatory to securing it in place. Fig. 4 is a top plan of the oil pot with the burner removed. Fig. 5 is a front elevation of the oil pot. Fig. 6 is a vertical section through the burner socket in line 6—6, Fig. 4. Fig. 7 is a detached elevation of the burner. Fig. 8 is a detached perspective view of the burner socket. Fig. 9 is a fragmentary plan view showing the burner locked to the oil pot.

Like letters of reference refer to like parts in the several figures.

A represents the oil pot and $a$ the top plate thereof. B represents the socket in which the burner C is seated and which is secured, as usual, in the central opening of the top plate $a$. This socket is provided with an upwardly-projecting collar $b$ which is cut away at the front side, so that a segmental opening or notch $b'$ is formed in said collar for the reception of the wick-raiser shaft $c$ of the burner. The cone is provided in its lower edge with a notch $e$ by which it straddles the wick-raiser shaft. In the construction shown in the drawings the cone is supported by the burner with the lower edge of the cone at a short distance above the top plate $a$ of the oil pot so that the air can enter underneath the cone. This construction may, however, be modified as the nature of the burner may require.

E represents two fastening lips or lugs which are secured to the top plate $a$ of the oil pot on diametrically opposite sides of the latter and which project upwardly and inwardly so as to engage over the outwardly projecting base flange $f$ of the cone. This base flange is provided on diametrically opposite sides with notches $g$ which correspond in size and location with the fastening lips or lugs E, so that the cone can be placed with its base flange below the inwardly overhanging top portions of these lugs or lips and can then be engaged with its base flange underneath said lugs or lips by turning the burner and cone in its seat. The segmental notch $b'$ in the collar of the burner socket is of such length that the wick-raiser shaft stands in the initial position of the burner at one end of the notch, near the shoulder $b^2$ thereof, as shown in Fig. 3, and in the final or secured position of the burner at the opposite end of the notch, near the shoulder $b^3$ thereof, as shown in Fig. 9. This notch compels the burner cone to be placed in the proper position, as in any other position the wick-raiser shaft will not allow the burner to be brought down on its seat.

$h$ represents locking projections formed on the lower portion of the burner cone in such position that they engage the fastening lugs or lips as the cone is turned in its seat and pass beyond these lugs or lips and project outwardly on the rear sides thereof as the cone reaches its final or secured position, as represented in Figs. 1, 2 and 9. The cone and lips or lugs, either or both, are sufficiently yielding and are of such form and size to enable these projections to be forced past the fastening lugs E by applying a moderate pressure circumferentially to the burner. When the burner has reached its final or secured position the projections $h$ stand on the farther or rear side of the lugs or lips E and the cone cannot turn back accidentally, whereby the burner is secured against accidental detachment. The burner can, however, be released by applying sufficient force in the proper direction to turn the projections $h$ backwardly past the holding lugs or lips E.

The ends $b^2$ $b^3$ of the segmental slot $b'$ in the collar of the burner socket form stops which limit the rotation of the burner in the socket. The rear end $b^3$ of the notch can be so arranged that it prevents further rotation of the burner in the securing direction, in which case the burner is held in its final or secured position against rotation in either direction, further forward rotation being prevented by the wick-raiser shaft striking the rear end $b^3$ of the notch and backward rotation being prevented by the projections $h$ in connection with the securing lugs or lips E.

The locking projections $h$ can be formed on the burner cone by indenting the metal of the cone outwardly, or in any other suitable manner. The fastening lugs or lips E may be made of wire, as shown, and are preferably rounded so that the locking projections $h$ can be moved past the overhanging parts of these lugs or lips upon applying sufficient force.

We claim as our invention:

1. The combination with a burner support having an inwardly overhanging fastening lug, of a burner capable of rotary movement in said support and having an outwardly projecting attaching portion which engages underneath said lug and having a rigid locking projection which is arranged in line with said lug and passes by the same as the burner is rotated to its locked position and engages against the rear side of said lug in such locked position, thereby resisting the backward rotation of the burner, substantially as set forth.

2. The combination with an oil pot having a burner socket and outside of the same inwardly overhanging fastening lugs, of a burner capable of rotary movement in said socket and having at its base an outwardly-projecting attaching flange which engages underneath said lugs and having above said flange rigid locking projections which are arranged in line with said lugs and pass by the same as the burner is rotated in the socket to its locked position and engage in the locked position of the burner against the rear side of said lugs, substantially as set forth.

3. The combination of an oil pot having its top plate provided with an opening for the burner and having a burner socket provided with an upwardly-projecting collar having a segmental notch which receives the wick-raiser shaft and limits the rotary movement of the burner, inwardly overhanging fastening lugs or lips secured to said top plate, and a burner capable of rotary movement and having an attaching flange adapted to engage underneath said lugs or lips and provided above said flange with a locking projection which resists backward rotation of the burner, substantially as set forth.

Witness our hands, this 12th day of October, 1905.

ERNEST C. EVERETT.
FRITZ $\times$ SCHINDEWOLF
his mark

Witnesses:
  OSCAR WARNER,
  A. E. LUERSSEN.